United States Patent
Ono et al.

(10) Patent No.: US 6,397,676 B1
(45) Date of Patent: Jun. 4, 2002

(54) PIEZOELECTRIC OSCILLATOR AND SIGNAL DETECTION APPARATUS USING THE SAME

(75) Inventors: Yasuichi Ono; Kazuo Hasegawa; Daisuke Takai, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/567,247

(22) Filed: May 9, 2000

(30) Foreign Application Priority Data

May 10, 1999 (JP) .......................................... 11-128545

(51) Int. Cl.[7] .............................................. G01C 19/00
(52) U.S. Cl. .................................................. 73/504.16
(58) Field of Search ........................ 73/504.12, 504.15, 73/504.16

(56) References Cited

U.S. PATENT DOCUMENTS 5,451,828 A  9/1995 Tomikawa et al. .......... 310/370

Primary Examiner—Richard A. Moller
(74) Attorney, Agent, or Firm—Brinks Hofer Gilson & Lione

(57) ABSTRACT

A driving signal is provided to six electrodes (driving electrodes) on one of the surfaces of each of three vibration legs of a three-pronged tuning-fork-type piezoelectric oscillator. Two output electrodes from among six electrodes (output electrodes) on the other surface thereof are connected to two current-to-voltage conversion devices, respectively. Since the two output electrodes are imaginarily short-circuited by the current-to-voltage conversion devices, there is no need to provide a ground electrode between the output electrodes. This makes it possible to simplify an electrode manufacturing process.

13 Claims, 14 Drawing Sheets

US 6,397,676 B1

PIEZOELECTRIC OSCILLATOR AND SIGNAL DETECTION APPARATUS USING THE SAME

BACKGROUND OF THE INVENTION

1. Field of the Invention

The present invention relates to a piezoelectric oscillator for use in gyroscopes, and more particularly, relates to a piezoelectric oscillator in which the number of electrodes is reduced, and relates to a signal detection apparatus using the same.

2. Description of the Related Art

FIG. 15A is a perspective view showing one of the surfaces of a conventional three-pronged tuning-fork-type piezoelectric oscillator. FIG. 15B is a perspective view showing the other surface thereof. FIG. 16 is a front view of a piezoelectric oscillator when the piezoelectric oscillator of FIG. 15A is viewed from the direction of arrow 16.

The whole of an oscillator 1 is formed from a plate-shaped piezoelectric material, such as a piezoelectric ceramic or a quartz crystal; a tip portion thereof is separated by slots 1A and 1A, and three vibration legs 1a, 1b, and 1c are integrally formed therewith. The dielectric polarization direction of the piezoelectric material in each of the vibration legs 1a, 1b, and 1c is as indicated by the arrows in FIG. 16. The dielectric polarization direction is the same for the vibration legs 1b and 1c on both right and left sides. In the center vibration leg 1a, the dielectric polarization direction is laterally and vertically symmetrical with respect to the vibration legs 1b and 1c on the right and left.

The lower surface of each of the vibration legs 1a, 1b, and 1c is formed with a pair of driving electrodes 2 and 2, using a conductive material. The driving electrodes 2, 2, . . . , extend up to the base end portion 1B of the oscillator 1, as shown in FIG. 15B. These driving electrodes 2, 2, . . . , are connected to an AC driving power supply 3 by wiring (not shown), so that a driving voltage of the same electrical potential is supplied to the driving electrodes 2, 2, . . . , from the AC driving power supply 3.

On the upper surface of the oscillator 1, a pair of ground electrodes 4 and 4 are formed in each of the vibration legs 1b and 1c on the right and left, and one ground electrode 4 is formed in the center vibration leg 1a. The driving electrodes 4, 4, . . . , extend to the base end portion 1B of the oscillator 1. On the surface of the oscillator 1 shown in FIG. 15A, a concentration pattern 4a is formed in the base end portion 1B, and all the ground electrodes 4 are connected to the concentration pattern 4a. Each of the ground electrodes 4 is at the ground potential by a wiring path (not shown).

The driving electrodes 2, 2, . . . , and the ground electrodes 4, 4, . . . , supply a driving voltage to the piezoelectric material which is a driving means. Based on the dielectric polarization structure shown in FIG. 16, the vibration legs 1b and 1c on the right and left are driven to vibrate at the same phase in the X direction, and the vibration leg 1a in the center is driven to vibrate 180° out of phase opposite to that of the vibration legs 1b and 1c on right and left similarly in the X direction. That is, at a particular point in time, the amplitude of the vibration legs 1b and 1c on the right and left in the X direction and the amplitude of the vibration leg 1a in the X direction are opposite.

The surface of the center vibration leg 1a is formed with a pair of detection electrodes 5a and 5b. The detection electrodes 5a and 5b extend more toward the front than the base end portion 1B in the back portion of the oscillator 1, and the detection electrodes 5a and 5b are formed integrally with land portions 5a1 and 5b1, respectively.

In a state in which the vibration legs 1a, 1b, and 1c are driven in the X direction, when the oscillator 1 is placed within a rotating system having an angular velocity ω about the Z axis, each of the vibration legs 1a, 1b, and 1c has a vibration component in the Y direction due to a Coriolis force. In the vibration legs 1b and 1c on both sides and the vibration leg 1a in the center, since the phases of vibrations by a driving voltage are opposite, the phases of vibrations by a Coriolis force are opposite between the vibration legs 1b and 1c and the vibration leg 1a. That is, at a particular point in time, the directions of the amplitude components, in the Y direction by the Coriolis forces, of the vibration legs 1b and 1c are the same, and the direction of the amplitude components in the Y direction, of the center vibration leg 1a is opposite to the direction of those of the vibration legs 1b and 1c.

The detection electrodes 5a and 5b are formed on the same plane (the same vibration plane) of the center vibration leg 1a, and the piezoelectric material of the center vibration leg 1a functions as a Coriolis force detection means. The dielectric polarization directions of the piezoelectric materials in the portions where the detection electrodes 5a and 5b are formed are opposite to each other. Therefore, when each of the vibration legs 1a, 1b, and 1c is driven to vibrate in the X direction in accordance with a driving signal from the AC driving power supply 3, and when an angular velocity ω is given, the Coriolis output component by vibrations in the Y direction by a Coriolis force cause a phase difference φ to occur between a detection output C from the detection electrode 5a and a detection output D from the detection electrode 5b.

For these detection outputs C and D, a DC voltage corresponding to the phase difference φ is detected by a phase difference detection means (not shown), the angular velocity ω is determined from this DC voltage, and the angle is determined by numerical integration of this angular velocity ω.

However, in the signal detection method in the above-described conventional gyroscope, there are problems such as those described below.

First, in the center vibration leg 1a, in addition to the detection electrode 5a and the detection electrode 5b, the ground electrode 4 is provided on the narrow surface thereof, and moreover, this ground electrode 4 must be formed parallel to the detection electrode 5a and the detection electrode 5b in an area from the tip of the vibration leg 1a up to the base end portion 1B.

However, it is difficult to evenly form the ground electrodes 4 at an equal spacing from both the detection electrodes 5a and 5b in the area from the tip of the vibration leg up to the base end portion 1B. Therefore, if the creeping distance Wa between the ground electrode 4 and the detection electrode 5a differs from the creeping distance Wb between the ground electrode 4 and the detection electrode 5b, there is a problem in that insulation breakdown is likely to occur between the ground electrode 4 and the detection electrode 5a or between the ground electrode 4 and the detection electrode 5b.

SUMMARY OF THE INVENTION

The present invention has been achieved to solve the above-described conventional problems. An object of the present invention is to provide a piezoelectric oscillator in which the number of ground electrodes, which are required conventionally, can be reduced, simplifying a manufacturing process.

Another object of the present invention is to provide a piezoelectric oscillator in which electrodes are arranged appropriately in vibration legs so that a phase difference can be reliably detected, and to provide a signal detection apparatus using this piezoelectric oscillator.

To achieve the above-mentioned objects, according to the present invention, there is provided a piezoelectric oscillator for outputting an angular velocity proportional to a Coriolis force in a rotating system, the piezoelectric oscillator comprising: a vibration leg having a rectangular or square cross section; a pair of driving electrodes extending with a spacing therebetween in a direction in which the vibration leg is driven and in the direction of the length of the vibration leg in the plane extending in the driving direction; and a pair of output electrodes opposing the driving electrodes, extending in the direction of the length of the vibration leg, on a surface opposite to the surface on which the driving electrodes of the vibration leg are formed, wherein when driving power is supplied to the driving electrodes, the vibration leg is driven to vibrate by a piezoelectric effect, and an angular velocity component proportional to the Coriolis force is obtained from the pair of output electrodes by a piezoelectric effect.

In the present invention, a pair of driving electrodes may be formed on the surface of one of the vibration legs, a pair of output electrodes may be formed on the other surface thereof, and no ground electrode need be provided between the driving electrodes and the output electrodes. This makes it possible to avoid the conventional problem of having to make the creeping distance equal between the two output electrodes and the ground electrode. Therefore, the problem of insulation breakdown can be eliminated.

Also, since a ground electrode for the purpose of grounding, provided between a pair of output electrodes, can be omitted, it is possible to simplify the manufacturing process for forming electrodes.

In the foregoing, the oscillator is preferably provided with three-pronged vibration legs, the driving electrode and the output electrode are provided in all the vibration legs, and a driving signal is supplied between the driving electrode and the output electrode so that an angular velocity component proportional to a Coriolis force is detected from at least one set of output electrodes from among the output electrodes.

A description is given by using a piezoelectric oscillator shown in FIG. 2. The one set of output electrodes described above is, most preferably, a combination of a pair of output electrodes a and b provided in a center vibration leg (11v). In addition, for example, they may be a combination of output electrodes a1 and b1 of a vibration leg (11u) on the left side, a combination of output electrodes a2 and b2 of a vibration leg (11w) on the right side, a combination of the output electrode a1 of the vibration leg (11u) on the left side and the output electrode b2 of the vibration leg (11w) on the right side, or a combination of the output electrode b1 of the vibration leg (11u) on the left side and the output electrode b2 of the vibration leg (11w) on the right side. It is also possible to make the outputs of the output electrodes a1 and a2 and the outputs of the output electrode b1 and b2 one set of output electrodes.

Preferably, an output electrode other than the one set of output electrodes is fixed to an invariable potential.

For example, the invariable potential is a ground potential, and in addition, may also be a power-supply voltage, a midpoint potential (½ of the power-supply voltage), etc., as long as it is an electrical potential which does not vary.

Also, when the axis which passes through the center of each vibration leg in the width direction and which extends in the direction of the length thereof is made a center axis of each vibration leg, the output electrode is preferably provided at a position which is farthest from the center axis in the plane of the vibration legs.

When the piezoelectric oscillator which is driven to vibrate is placed in a rotating system, a Coriolis force acts on each vibration leg so that the motion of each vibration leg becomes an elliptical motion. Therefore, since the position at which the displacement of the oscillator due to the Coriolis force becomes maximized is a position farthest from the center axis of each vibration leg, provision of an output electrode at this position allows a Coriolis force to be detected at higher sensitivity.

In addition, to achieve the above-mentioned objects, the present invention provides a signal detection apparatus comprising a piezoelectric oscillator comprising I/V (current/voltage) conversion means for converting a current output obtained from the output electrode into a voltage output, each of the output electrodes being grounded via an imaginary short-circuit in the I/V conversion means.

In the present invention, a pair of driving electrodes are formed on one of the surfaces of a vibration leg, and a pair of output electrodes are formed on the other surface thereof. An AC driving signal is supplied to the driving electrode, and each pair of electrodes disposed in the vibration legs on both sides within the other surface are connected to a ground potential or to an invariable potential, making it possible to vibrate the vibration legs on both sides in the same phase. Also, the electrode disposed in the center vibration leg is connected to the I/V conversion means comprising an operational amplifier, etc. Between an inversion terminal and a non-inversion terminal of the operational amplifier, which is a constituent of the I/V conversion means, the inversion terminal is at a ground potential due to the imaginary short-circuit. Thus, it is possible to cause the center vibration leg to be driven to vibrate even if a ground electrode is not formed as in the conventional case.

The above and further objects, aspects and novel features of the invention will become more apparent from the following detailed description when read in conjunction with the accompanying drawings.

BRIEF DESCRIPTION OF THE DRAWINGS

FIG. 8A shows the distance between the center axis and each output electrode;

FIG. 9A shows the distance between the center axis and each output electrode; FIG. 9B shows a voltage output; and FIG. 9C shows a current output;

FIG. 10A shows the distance between the center axis and each output electrode; FIG. 10B shows a voltage output; and FIG. 10C shows a current output;

FIG. 11A shows the distance between the center axis and each output electrode; FIG. 11B shows a voltage output; and FIG. 11C shows a current output;

FIG. 12A shows the distance between the center axis and each output electrode; FIG. 12B shows a voltage output; and FIG. 12C shows a current output;

FIG. 13A shows the distance between the center axis and each output electrode; FIG. 13B shows a voltage output; and FIG. 13C shows a current output;

FIG. 14A shows the distance between the center axis and each output electrode; FIG. 14B shows a voltage output; and FIG. 14C shows a current output;

The above and further objects, aspects and novel features of the invention will become more apparent from the following detailed description when read in conjunction with the accompanying drawings.

DESCRIPTION OF THE PREFERRED EMBODIMENTS

Preferred embodiments of the present invention are described below with reference to the accompanying drawings.

Figure 1:
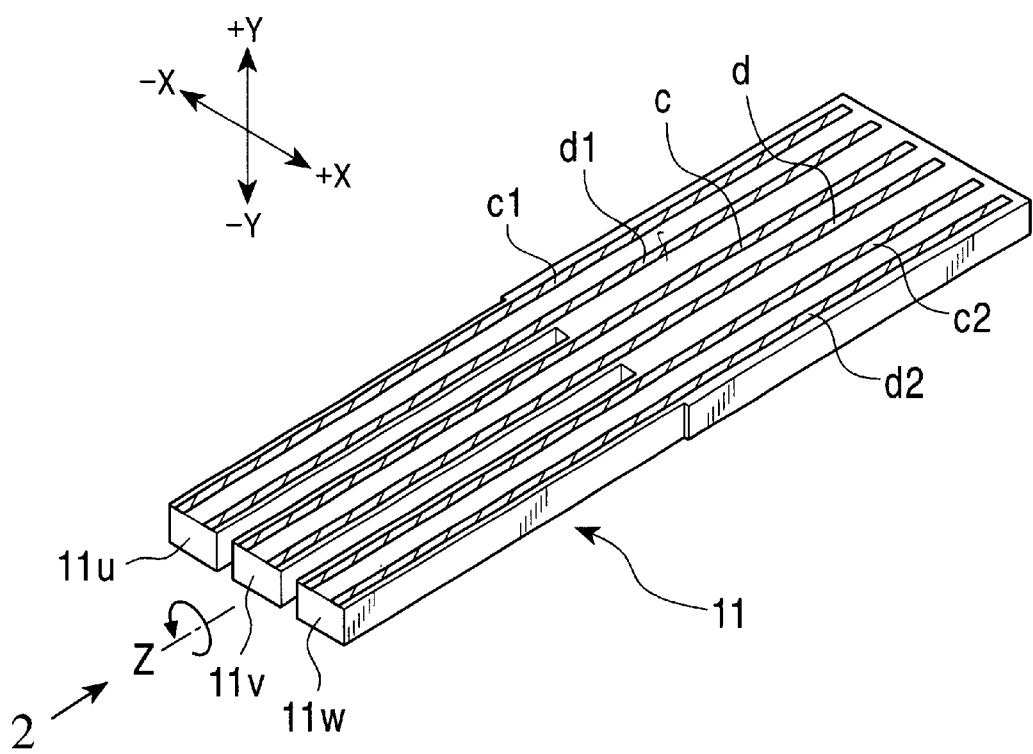
FIG. 1 is a perspective view of a piezoelectric oscillator in a gyroscope.
Figure 2:
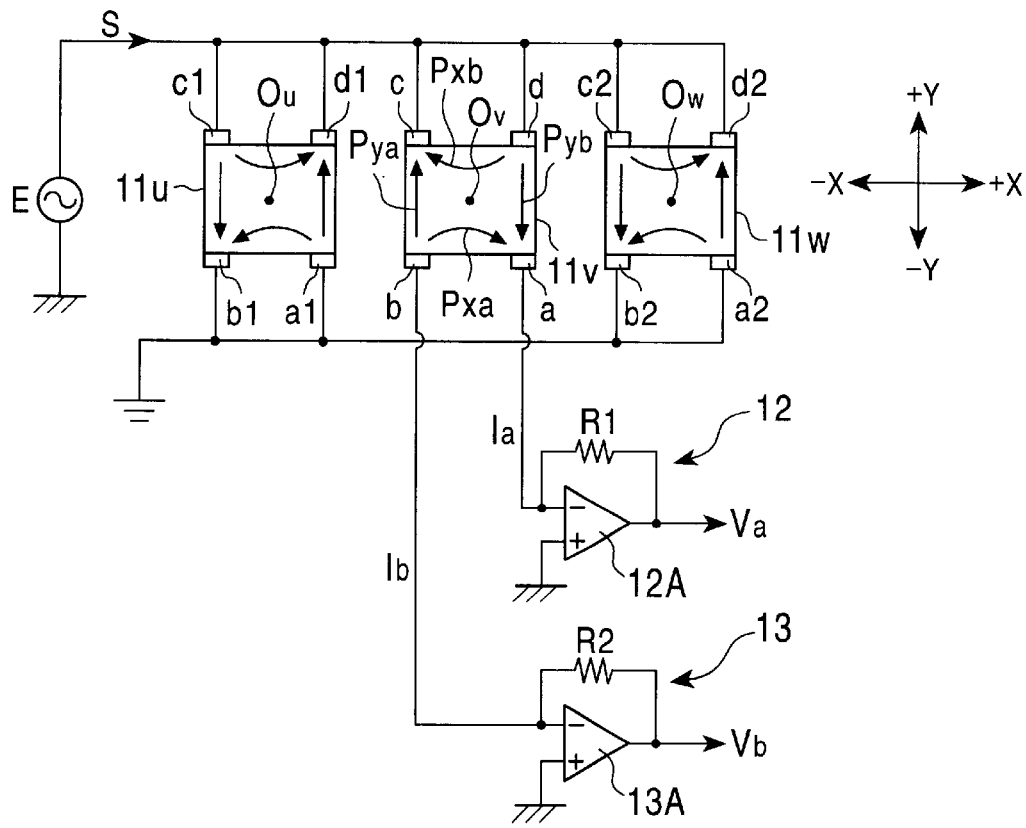
FIG. 2 is a front view of the piezoelectric oscillator when the piezoelectric oscillator of FIG. 1 is viewed from the direction of arrow 2.
Figure 3:
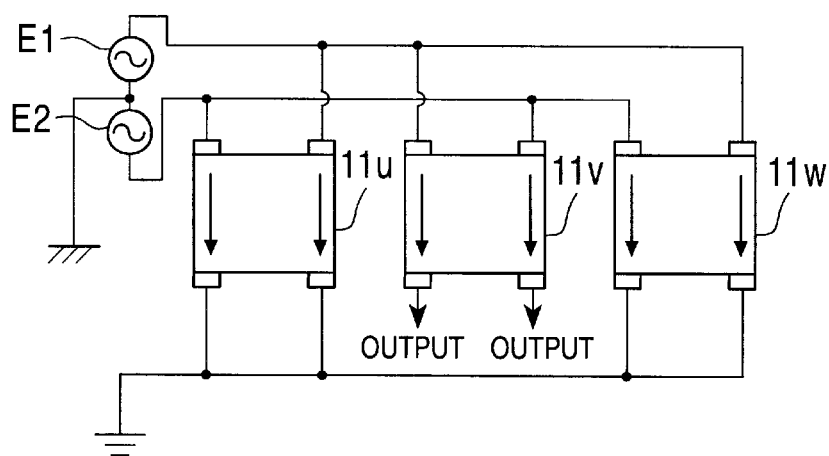
FIG. 3 is a front view showing the polarized state of another piezoelectric oscillator.
Figure 4A:
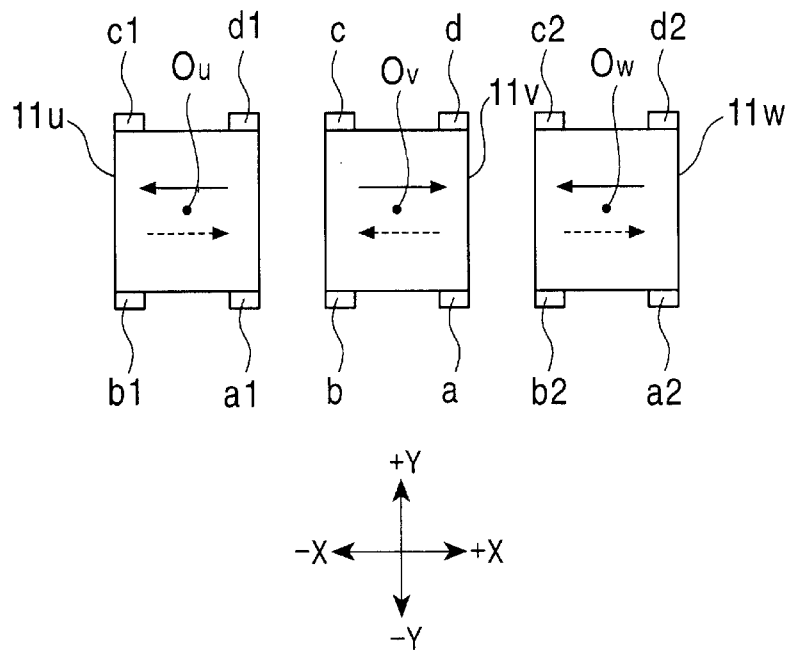
FIG. 4A is a front view of each vibration leg when a vibration in the X direction is supplied to the piezoelectric oscillator.
Figure 4B:
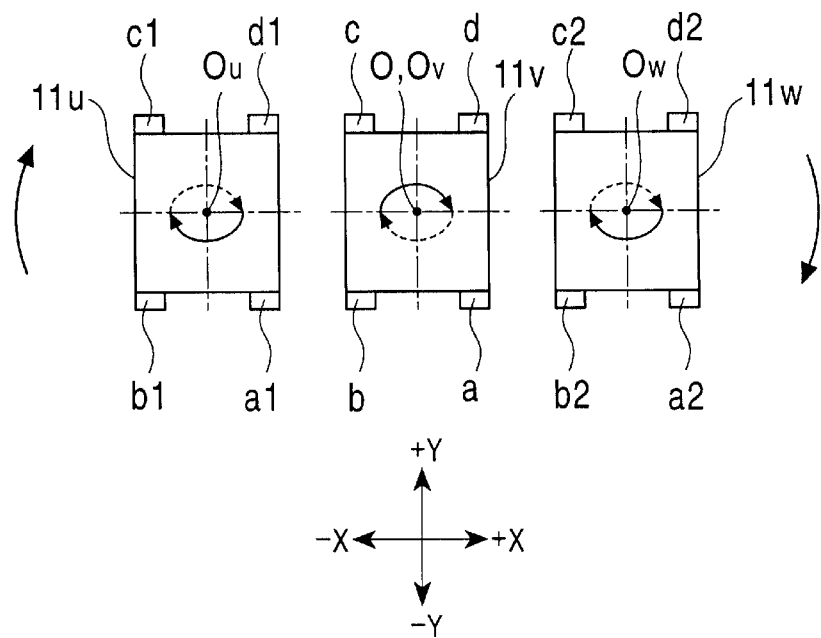
FIG. 4B is a front view of each vibration leg when the piezoelectric oscillator is placed in a rotating system.

FIG. 1 is a perspective view of a piezoelectric oscillator in a gyroscope. FIG. 2 is a front view of the piezoelectric oscillator when the piezoelectric oscillator of FIG. 1 is viewed from the direction of arrow 2. FIG. 3 is a front view showing the polarized state of another piezoelectric oscillator. FIG. 4A is a front view of each vibration leg when a vibration in the X direction is applied to the piezoelectric oscillator. FIG. 4B is a front view of each vibration leg when the piezoelectric oscillator is placed in a rotating system.

As shown in FIG. 1, the whole of a piezoelectric oscillator 11 is formed by a plate member of a piezoelectric material formed from lead zirconate titanate (PZT) or a quartz crystal, and three vibration legs 11*u*, 11*v*, and 1*w*are formed so as to branch in the tip of the piezoelectric oscillator 11.

The dielectric polarization direction of the piezoelectric material in each of the vibration legs 11*u*, 11*v*, and 11*w* is as indicated by the arrows in FIG. 2. That is, the dielectric polarization direction is the same for the vibration legs 11*u* and 11*w* on both right and left sides, and in the vibration leg 11*v* in the center, the dielectric polarization direction is symmetrical laterally and vertically with respect to the vibration legs 11*u* and 11*w* on the right and left.

In the following, in the center vibration leg 11*v* shown in FIG. 2, polarization from an output electrode b toward an output electrode a is set to $P_{xa}$, polarization from a driving electrode d toward a driving electrode c is set to $P_{xb}$, polarization from the output electrode b toward the driving electrode c is set to $P_{ya}$, and polarization from the driving electrode d toward the output electrode a is set to $P_{yb}$.

As shown in FIGS. 2 and 4, in one of the surfaces (+Y side) of each of the vibration legs 11*u*, 11*v*, and 11*w*, driving electrodes c1, d1, c, d, c2, and d2, formed from a conductive material, such as a silver-containing cermet conductor or a copper foil, are each printed and formed (extending) in a direction from the tip of each vibration leg to the base end. In a similar manner, on the other surface (−Y side) thereof, electrodes b1, a1, b, a, b2, and a2 corresponding to the above-described driving electrodes are each printed and formed.

As shown in FIG. 2, the driving electrodes c1, d1, c, d, c2, and d2 are connected to an AC driving signal source E. Also, the output electrodes b1, a1, b2, and a2 of the vibration legs 11*u* and 11*w* on both sides are connected to a ground potential (0 volt). The output electrodes b1, a1, b2, and a2 may be connected to a potential other than a ground potential, for example, a midpoint potential, if they are continuously fixed to a constant potential (invariable potential).

Also, the electrodes a and b of the center vibration leg 11*v* are output electrodes. The output electrodes a and b are connected to I/V conversion means 12 and 13, respectively, for converting a current output to a voltage output. The I/V conversion means 12 and 13 mainly comprise operational amplifiers 12A and 13A, respectively, so that current outputs $I_a$ and $I_b$ of the output electrodes a and b are converted into voltage outputs $V_a$ and $V_b$, respectively.

Non-inversion terminals (+terminals) of the operational amplifiers 12A and 13A are grounded, and although the input impedances of the operational amplifiers 12A and 13A themselves are very large, the input impedances as the I/V conversion means 12 and 13 are very small. As a result, since most of the current outputs $I_a$ and $I_b$ flow through external resistors R1 and R2, respectively, the voltage outputs $V_a$ and $V_b$ are $V_a = -R1 \cdot I_a$ and $V_b = -R2 \cdot I_b$, respectively.

Also, since the section between the inversion terminal (−terminal) and the non-inversion terminal (+terminal) is imaginarily short-circuited (imaginarily grounded), the potential of the inversion terminal reaches almost a ground potential. Therefore, even if a ground electrode G is provided between the electrodes a and b, and this ground electrode G and the ground potential are not connected to each other as in the conventional case, the voltage outputs $V_a$ and $V_b$ can be obtained. Therefore, it is possible to omit the ground electrode G between the electrodes a and b.

The connection between the polarization arrangements of each of the vibration legs $11u$, $11v$, and $11w$ and the AC driving signal source may be, for example, that shown in FIG. 3. That is, when all the polarizations of each of the vibration legs $11u$, $11v$, and $11w$ are made in the same direction, for a driving signal to be supplied to the center vibration leg $11v$ and a driving signal to be supplied to the vibration legs $11u$ and $11w$ on both sides, power supplies E1 and E2, which are out of phase with each other by 180°, may be used. Alternatively, driving signals which are 180° out of phase may be generated from a driving signal of one AC driving signal source E, and these may be applied in a manner similar to that described above.

In FIG. 2, when a sinusoidal AC driving signal S (driving signal) is supplied from the AC driving signal source E to each of the driving electrodes c1, d1, c, d, c2, and d2, the vibration legs $11u$, $11v$, and $11w$ are driven to vibrate, by a piezoelectric effect, in the X direction (+X and −X directions) which is the direction in which each vibration leg is arranged.

In each of the vibration legs $11u$, $11v$, and $11w$, bending deformation vibrations by a primary or several-order mode occurs in the X direction. Also, the vibration legs $11u$ and $11w$ on both sides are driven in the same phase, and the center vibration leg $11v$ is driven in a phase which is different by $\pi$ (180°) from those of the vibration legs $11u$ and $11w$ on both sides. That is, as shown in FIG. 4A, when the direction of the amplitude at a particular point in time of the vibration legs $11u$ and $11w$ on both sides is in the +X direction, the amplitude direction of the center vibration leg $11v$ is in the −X direction (the arrow of the dotted line). Also, when both the vibration legs $11u$ and $11w$ vibrate in the −X direction, the amplitude direction of the center vibration leg $11v$ is in the +X direction (the arrow of the solid line).

Here, if each of the center axes of each of the vibration legs $11u$, $11v$, and $11w$ is set to $O_u$, $O_v$, and $O_w$, respectively, the center axis $O_v$ of the center vibration leg $11v$ corresponds to the neutral axis O of the piezoelectric oscillator 11 when vibrations do not occur. Then, when vibrations occur in the X direction, the center axis $O_v$ of the center vibration leg $11_v$ vibrates in the +X direction and in the −X direction about the neutral axis O. On the other hand, since the vibration legs $11u$ and $11w$ on both sides vibrate in the X direction laterally symmetrical with respect to the neutral axis O, they have a role as balancers for the center vibration leg $11v$ to vibrate evenly from side to side.

Figure 5A:
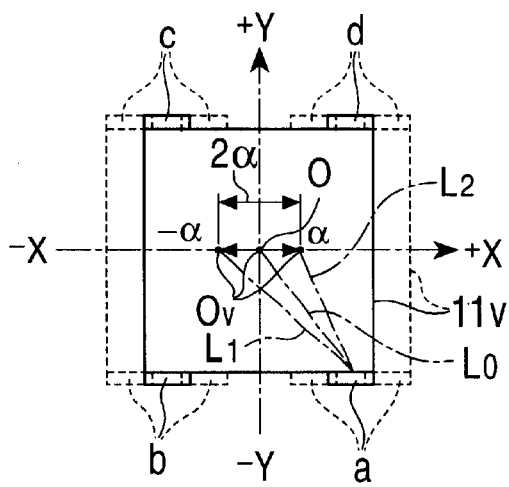
FIG. 5A is a front view of a center vibration leg.
Figure 5B:
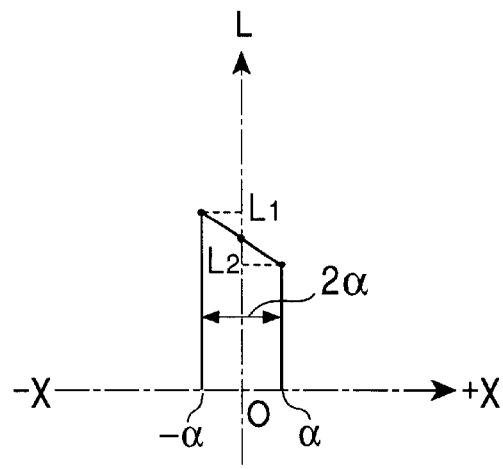
FIG. 5B shows the relationship of the relative distance between the center axis and an output electrode in a case in which a vibration in the X direction is applied to the vibration leg of FIG. 5A.
Figure 6A:
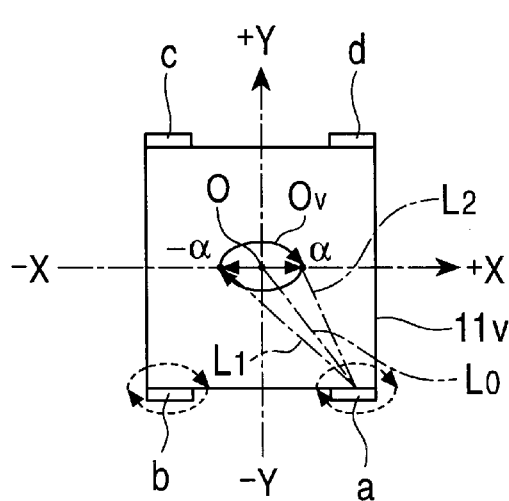
FIG. 6A is a front view showing the end surface of the center vibration leg.
Figure 6B:
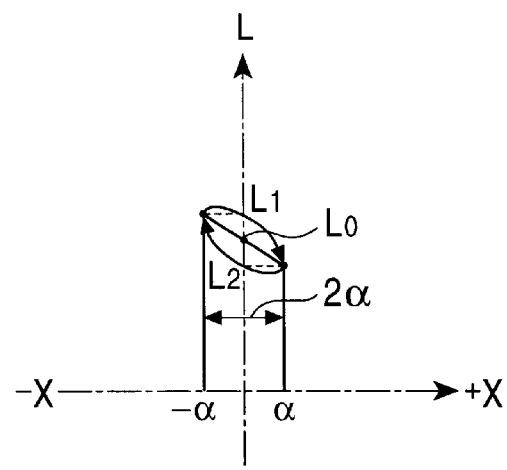
FIG. 6B shows the relationship of the relative distance between the center axis and the output electrode in a case in which a vibration in the X direction is applied to the vibration leg of FIG. 6A and the piezoelectric oscillator is placed in a rotating system.

FIG. 5A is a front view showing the end surface of a vibration leg in the center. FIG. 5B shows the relationship of the relative distance between the center axis and an output electrode in a case in which a vibration in the X direction is applied to the vibration leg of FIG. 5A. FIG. 6A is a front view showing the end surface of the center vibration leg. FIG. 6B shows the relationship of the relative distance between the center axis and the output electrode in a case in which a vibration in the X direction is applied to the vibration leg of FIG. 6A and the piezoelectric oscillator is placed in a rotating system.

As shown in FIG. 5A, when the center vibration leg $11_v$ is taken note of, in a state in which vibrations occur in the X direction, the center axis $O_v$ of the center vibration leg $11v$ draws a trajectory which reciprocates between the coordinates $(\alpha, 0)$ and $(-\alpha, 0)$ on the X axis. Here, when one of the electrodes a is regarded as being fixed and the relative distance L between this electrode a and the center axis $O_v$ in the trajectory is determined, the trajectory is shown as a straight line which slants downward to the right, such as that shown in FIG. 5B. As shown in FIG. 5A, however, a distance between the center axis $O_v$ when the center axis $O_v$ of the center vibration leg $11v$ matches the neutral axis O, and the electrode a is set to $L_o$, a distance between the center axis $O_v$ when the center axis $O_v$ of the center vibration leg $11v$ is at the coordinates $(\alpha, 0)$ in which the center axis $O_v$ of the vibration leg $11v$ is moved greatest in the +X direction with respect to the neutral axis O, and the electrode a is set to $L_2$, and a distance between the center axis $O_v$, when the center axis $O_v$ thereof is at the coordinates $(-\alpha, 0)$ in which the center axis $O_v$ of the vibration leg $11v$ is moved greatest in the −X direction with respect to the neutral axis O, and the electrode a is set to $L_1$, the amplitude of the vibration leg $11v$ being $2\alpha$ $(=\alpha-(-\alpha))$.

In a state in which the piezoelectric oscillator 11 is driven to vibrate in the X direction in the manner described above, when the piezoelectric oscillator 11 is placed in a rotating system about the Z axis, a Coriolis force in the components in the Y-axis direction acts on the piezoelectric oscillator 11. That is, as shown in FIG. 4B, when the piezoelectric oscillator 11 is caused to rotate, for example, in a clockwise direction, since the components of the Coriolis force in the Y direction are combined with the vibration in the X direction, each of the vibration legs $11u$, $11v$, and $11w$ moves along an elliptical path in a clockwise direction.

At this time, when the center vibration leg $11v$ is taken note of, the center axis $O_v$ of the vibration leg $11v$ draws an elliptical trajectory, such as that indicated by the solid line in FIG. 6A. Also, since the distance between the center axis $O_v$ and the electrode a does not vary, each of the electrodes a and b draws an elliptical trajectory, such as that indicated by the dotted line in the figure. Here, when one of the output electrodes a is considered as being fixed in a manner similar to that described above and the relative distance L between this output electrode a and the center axis $O_v$ in the elliptical trajectory is determined, as shown in FIG. 6B, an elliptical trajectory is followed in which the above-mentioned straight line slanting downward to the right, shown in FIG. 5B, is the major axis thereof.

From the foregoing, when the piezoelectric oscillator 11 which is driven to vibrate in the X-axis direction is placed in a rotating system about the Z axis, the Coriolis force acts in the Y-axis direction perpendicular to the X-axis direction due to this rotation. As a result, it can be seen that the vibration leg $11v$ is driven to vibrate while following an elliptical trajectory about the neutral axis O. Therefore, when the rotating system is in a clockwise direction, the vibration leg $11v$ moves along an elliptical path in the sequence: output electrode a→output electrode b→driving electrode c→driving electrode d→output electrode a.

Therefore, when the output electrode a side is in a compressed state, the driving electrode c side which is positioned at a side opposite thereto is in an expanded state. Also, the output electrode b side is in a state of shifting from an expanded state to a compressed state, and the driving electrode d side is in a state of shifting from a compressed state to a expanded state. Next, when the output electrode b side reaches a compressed state, the driving electrode d side is in an expanded state, the electrode a side is in a state of shifting from a compressed state to an expanded state, and the driving electrode c side is in a state of shifting from an expanded state to a compressed state. Hereafter, in a similar manner, the compression and the expansion of the piezoelectric oscillator 11 are repeated along the elliptical trajectory. Therefore, when the vibration leg $11v$ is rotated in a clockwise direction, an electromotive force is generated in the electrodes in the sequence: a→b→c→d→a.

Also, since it takes slight time until the compressed state shifts from the output electrode a side to the output electrode b side or until the expanded state shifts from the electrode a side to the output electrode b side, a slight delay occurs also between the output signal generated in the electrode a by the electromotive force and the output signal (current output) generated in the output electrode b by the electromotive force. Therefore, when the piezoelectric oscillator 11 in which the electrode c and the electrode d are driving electrodes and the electrodes a and b are output electrodes is placed in a rotating system, it is possible to detect a phase difference between the output signal of the electrode a and the output signal of the output electrode b. The magnitude of this phase difference is proportional to the angular velocity.

Also, the larger the rotational force of the rotating system is, the greater the Coriolis force acts, the more the elliptical trajectory becomes circular, and the more time it takes for the compressed or expanded state to shift from the output electrode a to the output electrode b. Alternatively, if the distance between the center axis $O_v$ and the output electrode a or the distance between the center axis $O_v$ and the output electrode b is increased, a large elliptical motion results, and consequently, it takes a long time for the compressed or expanded state to shift from the output electrode a to the output electrode b. That is, the larger the Coriolis force or the greater the distance between the center axis $O_v$ and the output electrode a or b, the larger the phase difference between the output signal of the output electrode a and the output signal of the output electrode b. Therefore, it is possible to detect the phase difference therebetween with high accuracy.

Also, although it is possible to detect the Coriolis force as the amount of variation of the voltage output (amplitude) between the driving electrode d and the output electrode a and/or between the driving electrode c and the output electrode b in order to determine the angular velocity, in this case, the amplitude of the output signal is likely to vary due to variations in the voltage of the AC driving signal source and due to variations in the temperature of the piezoelectric material. For this reason, an AGC (automatic gain control) circuit, etc., must be added to a control circuit so as to stabilize the amplitude. However, in the above-described case, since no variation occurs in the phase difference, it is possible to omit the AGC circuit, etc.

Also, in the foregoing, the output electrode a and the output electrode b are formed on the same plane as the vibration legs, and a ground electrode need not be formed therebetween as in the conventional case, making it possible to simplify a manufacturing process. Therefore, there is no need to make the creeping distance between the output electrodes and the ground electrode uniform, and the problem of insulation breakdown does not occur.

In the following, the relationship between the elliptical motion of the vibration leg and the output signal is considered theoretically.

Figure 7:
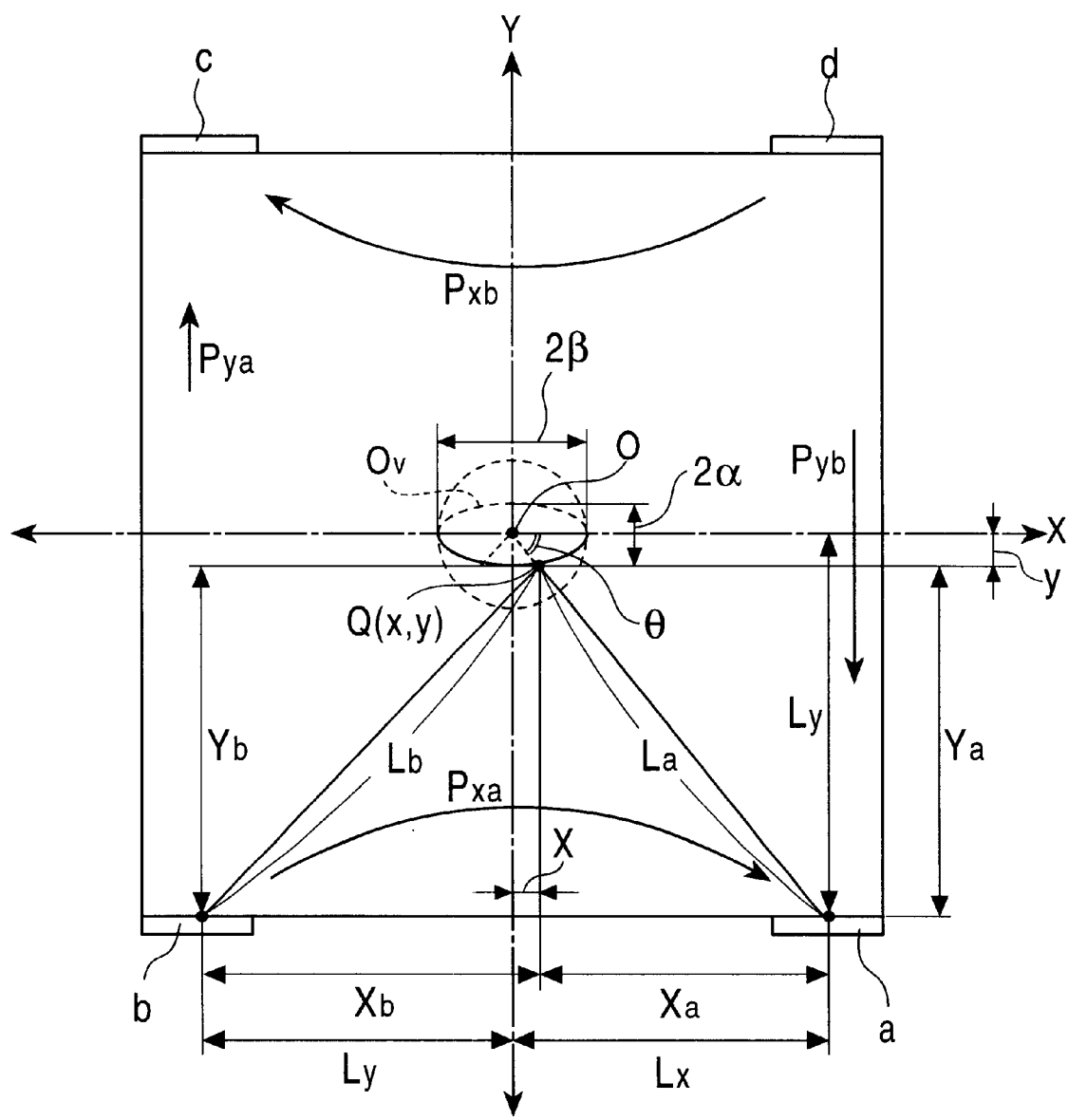
FIG. 7 is an enlarged front view of the center vibration leg.

FIG. 7 is an enlarged view of the end surface of the center vibration leg. In FIG. 7, if the length of the major axis of the ellipse drawn by the center axis $O_v$ is set to $2\alpha$, the minor axis thereof is set to $2\beta$ ($\alpha \geq \beta$), and the eccentric angle is set to $\theta$, the coordinates (x, y) of an arbitrary point Q in the elliptical trajectory are expressed as $x = \alpha \cos \theta$ and $y = \beta\theta \cos$.

Also, if the distance from the center axis $O_v$ to the output electrode a in the X-axis direction is set to $L_x$, the distance $X_a$ between the point Q and the output electrode a in the X-axis direction can be expressed as $X_a = L_x - x = L_x - \alpha \cos \theta$. Also, if the distance from the center axis $O_v$ to the output electrode a in the Y-axis direction is set to $L_y$, the distance $Y_a$ between the point Q and the output electrode a in the Y-axis direction can be expressed as $Y_a = L_y - y = L_y - \beta \cos \theta$. Therefore, the distance $L_a$ from the arbitrary point Q to the output electrode a is as in equation (1):

$$L_a = \sqrt{X_a^2 + Y_a^2} \tag{1}$$

In a similar manner, the distance $X_b$ from an arbitrary point Q to the output electrode b in the X-axis direction can be expressed as $X_b = L_y + x = L_x + \alpha \cos \theta$ because $L_y = L_x$ due to the symmetry between the positions of the output electrodes a and b. If the distance from the point Q to the output electrode b in the Y-axis direction is set to $Y_b$ ($= Y_a$), the distance $L_b$ from the point Q to the output electrode b is as in equation (2):

$$L_b = \sqrt{X_b^2 + Y_b^2} \tag{2}$$

Next, a case is considered in which the vibration leg 11v is compressed or expanded in the X direction and in the Y direction.

When the vibration leg 11v is driven to vibrate in the +X direction, the output electrode a side and the driving output d side are compressed, and the output electrode b side and the driving electrode c side are expanded. Also, when the vibration leg 11v is driven to vibrate in the −X direction, the output electrode a side and the driving output d side are expanded, and the output electrode b side and the driving electrode c side are compressed. This state can be considered in a manner similar to a case in which each electrode of the vibration leg 11v is fixed and only the center axis $O_v$ is vibrated in the +X direction or in the −X direction.

Accordingly, when a case is assumed in which each electrode of the vibration leg 11v is fixed, only the center axis $O_v$ is made to move along an elliptical path, distortion occurs in the vibration leg 11v, the compression ratio $P_x$ in the X direction can be expressed as $P_x = L_x/X_a$. Also, when only the amount of increase $\Delta P_x$ is considered, $\Delta P_x = 1 - P_x$. Here, if the polarization coefficient of the polarization $P_{xa}$ is set to $K_{xa}$, the electromotive force $E_{ax}$ in the output electrode a due to distortion in the X direction can be expressed as $E_{ax} = K_{xa} \cdot \Delta P_x$. In a similar manner, the compression ratio in the Y direction is set to $P_y$, $P_y = L_y/Y_a$, and when the amount of increase is set to $\Delta P_y$, $\Delta P_y = 1 - P_y$. Here, if the polarization coefficient of the polarization $P_{ya}$ is set to $K_{ya}$, the electromotive force $E_{ay}$ in the output electrode a due to distortion in the Y direction can be expressed as $E_{ay} = K_{ya} \cdot \Delta P_y$. Therefore, if the total electromotive force in the output electrode a is set to $E_a$, the electromotive force $E_a$ can be expressed as $E_a = E_{ax} + E_{ay}$.

Furthermore, when an external circuit connected to the output electrode a is considered and electric current which flows into the external circuit from the output electrode a is set to $I_a$, the current $I_a$ can be expressed as $I_a = dE_a/dt$ by using the electromotive force $E_a$. For the sake of convenience, when dt of the denominator is considered as $\Delta$deg (degree), the current $I_a$ can be expressed as in equation (3):

$$I_a \approx \frac{\Delta E_a}{\Delta deg} \tag{3}$$

Next, based on the above considerations, by using the major axis $\alpha$ of the elliptical trajectory, the minor axis $\beta$ thereof, and the polarization coefficient K as parameters, numerical calculations are performed on the distance $L_a$ between the center axis $O_y$ and the output electrode a, the distance $L_b$ between the center axis $O_y$ and the output electrode b, and the voltage output and the current output in the electrodes a and b. Thus, a first embodiment to a seventh embodiment are described below. The values of the parameters in each embodiment are shown in Table 1, and the values of the major axis α and the minor axis β of the elliptical trajectory are ratios in a case in which the distance $L_x$ from the neutral axis O to the output electrode a and the distance $L_y$ from the neutral axis O to the output electrode b are set to $L_x=L_y=500$.

Also, a case is shown in which a sinusoidal vibration is applied to the center vibration leg 1ν only in the X direction and in which each electrode of the center vibration leg 1ν is considered as being fixed, and each polarization is compressed or extended when the center axis $O_y$ is moved along a straight line, an ellipse, or a circular trajectory.

Also, the polarizations $P_{xa}$ and $P_{ya}$ with respect to the output electrode a, and the polarizations $P_{xb}$ and $P_{yb}$ with respect to the output electrode b differ in polarization direction. When this point is taken into consideration and when the piezoelectric oscillator 11 is driven to vibrate in the +X direction and in the −X direction, as the outputs of the electrodes a and b, the voltage outputs (electromotive forces) $V_a$ and $V_b$ of the same phase, such as those shown in FIG. 8B, are obtained.

However, the actual outputs of the electrodes a and b of the vibration leg 11ν are current outputs (see FIG. 2). Therefore, by converting the voltage outputs $V_a$ and $V_b$ shown in FIG. 8B, current outputs $I_a$ and $I_b$ of the same phase, such as those shown in FIG. 8C, are determined. When a current waveform is converted into a voltage waveform, since the output is inverted, the phase of the voltage waveform is delayed by π.

Figure 9A:
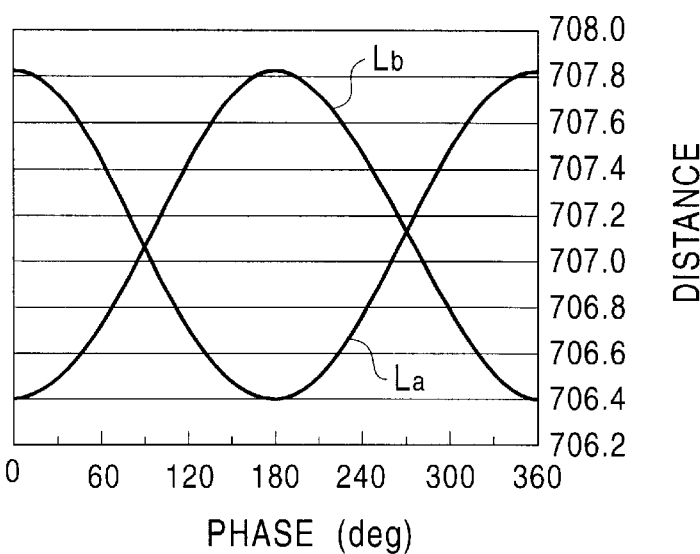
FIGS. 9A, 9B, and 9C show the results of numerical calculations when a major axis α of an elliptical trajectory: a minor axis β thereof=1:0.05.
Figure 9B:
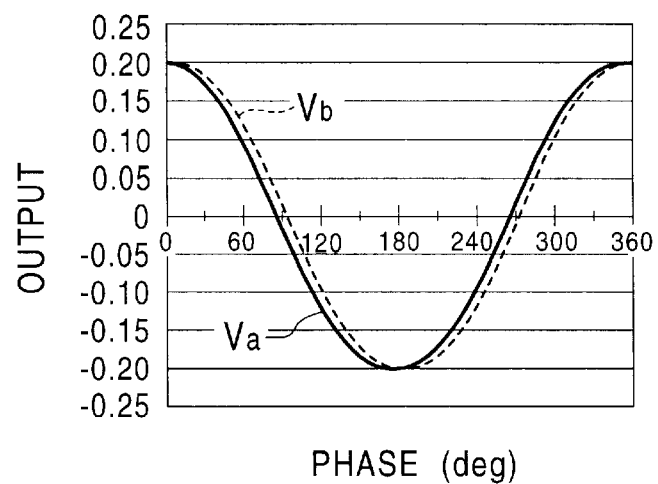
Figure 9C:
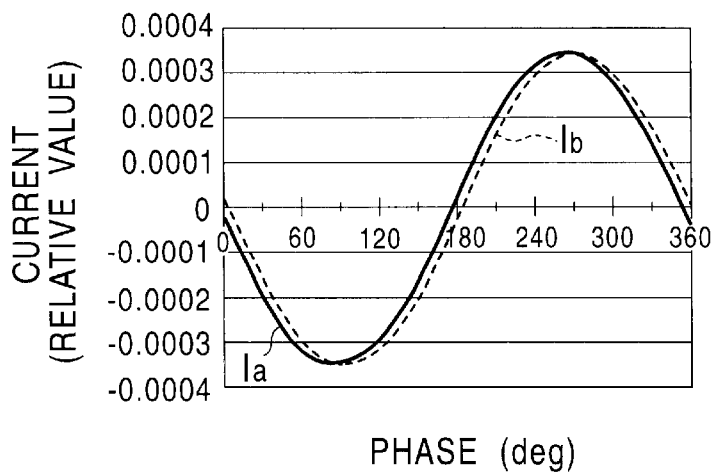

FIGS. 9A, 9B, and 9C show analysis results of each numerical calculation in a second embodiment in which the

TABLE 1

Figure 8A:
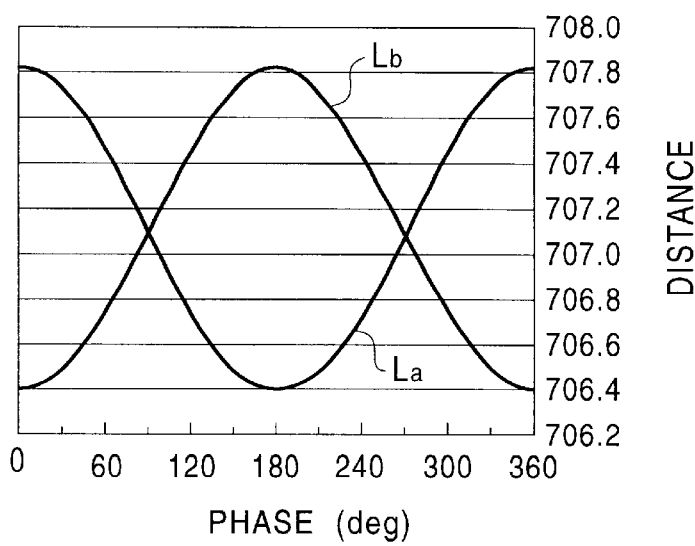
FIGS. 8A, 8B, and 8C show the results of numerical calculations when the piezoelectric oscillator is not present in a rotating system.
Figure 8B:
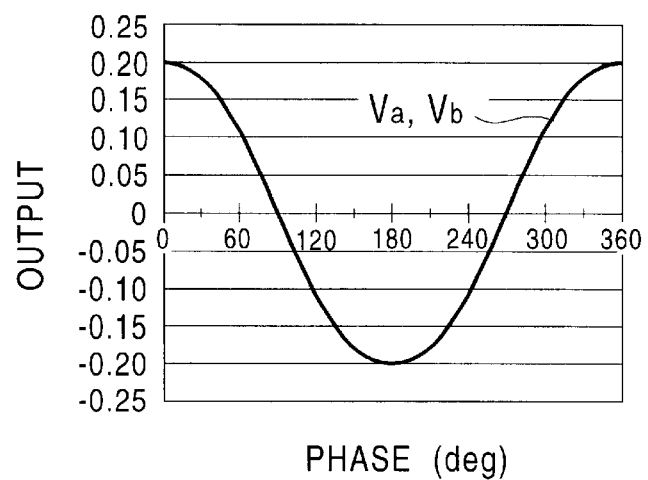
Figure 8C:
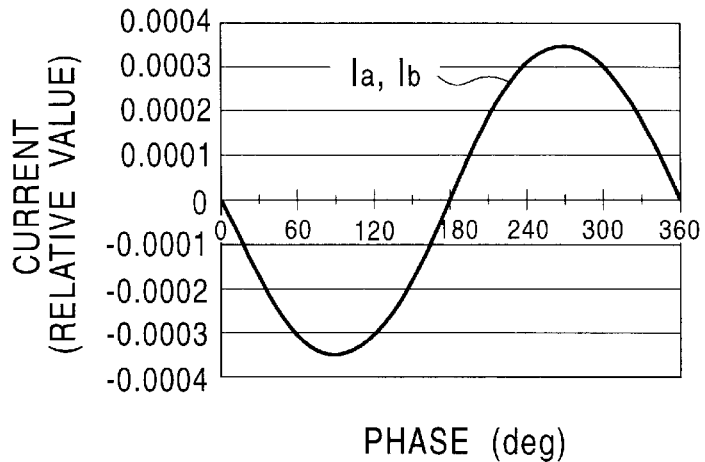
Figure 10A:
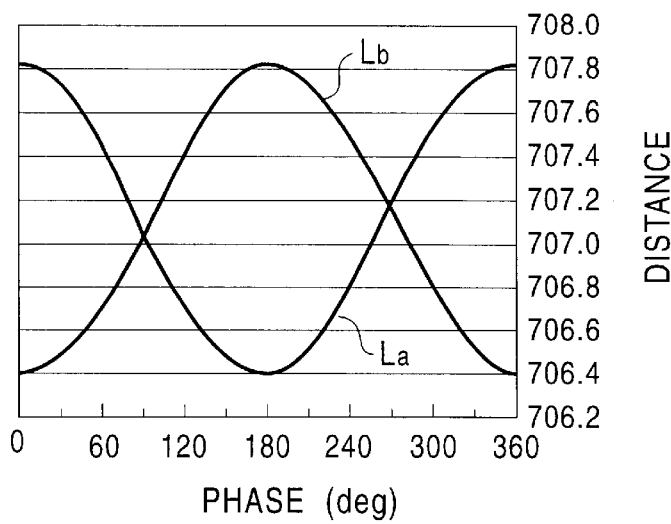
FIGS. 10A, 10B, and 10C show the results of numerical calculations when a major axis a of an elliptical trajectory: a minor axis β thereof=1:0.1.
Figure 10B:
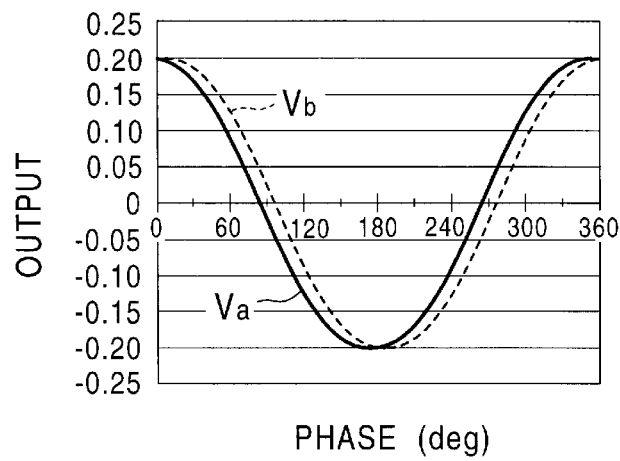
Figure 10C:
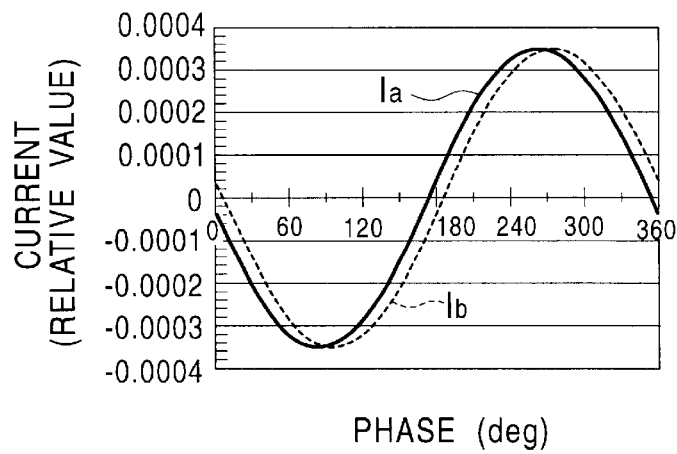
Figure 11A:
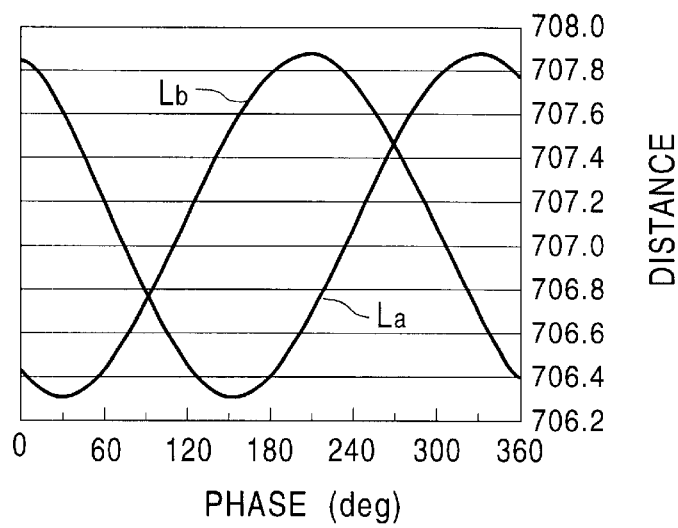
FIGS. 11A, 11B, and 11C show the results of numerical calculations when a major axis α of an elliptical trajectory: a minor axis β thereof=1:0.5.
Figure 11B:
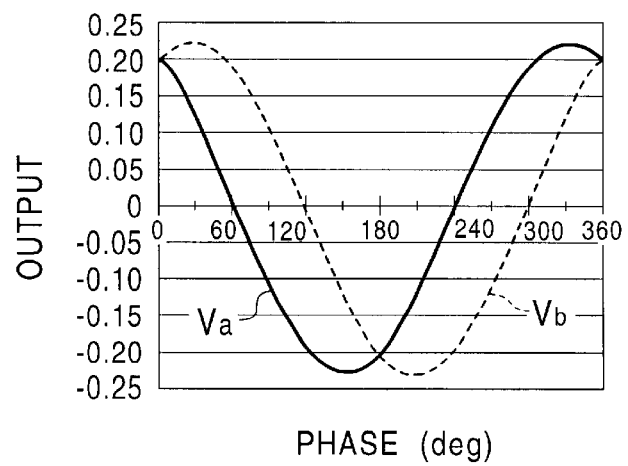
Figure 11C:
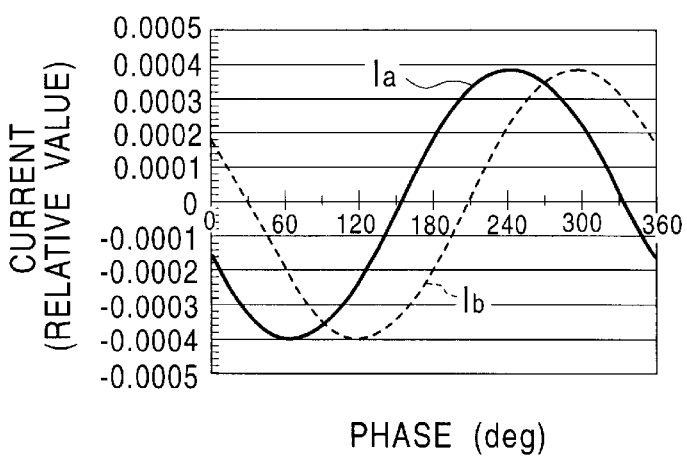
Figure 12A:
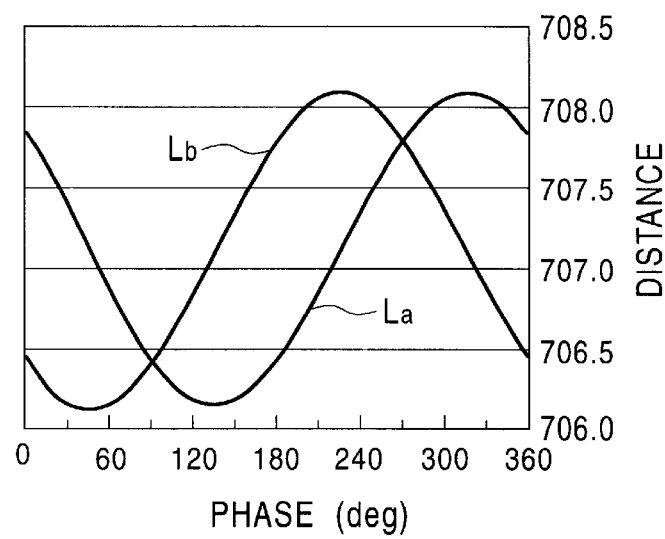
FIGS. 12A, 12B, and 12C show the results of numerical calculations when a major axis α of an elliptical trajectory: a minor axis β thereof=1:1.
Figure 12B:
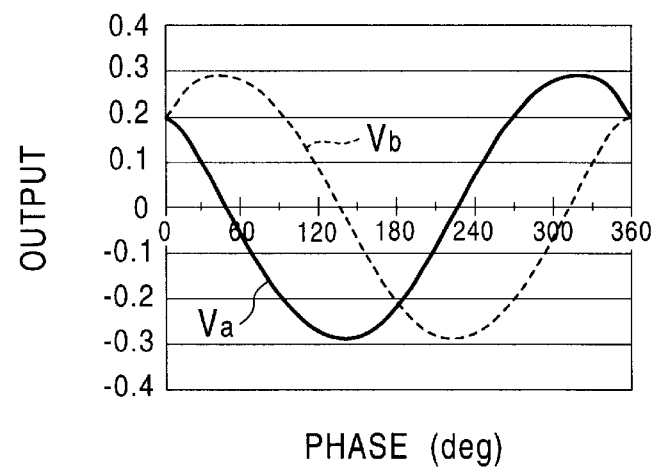
Figure 12C:
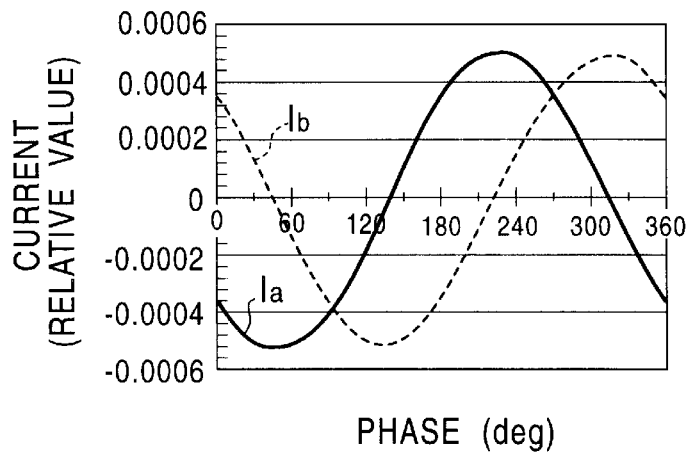
Figure 13A:
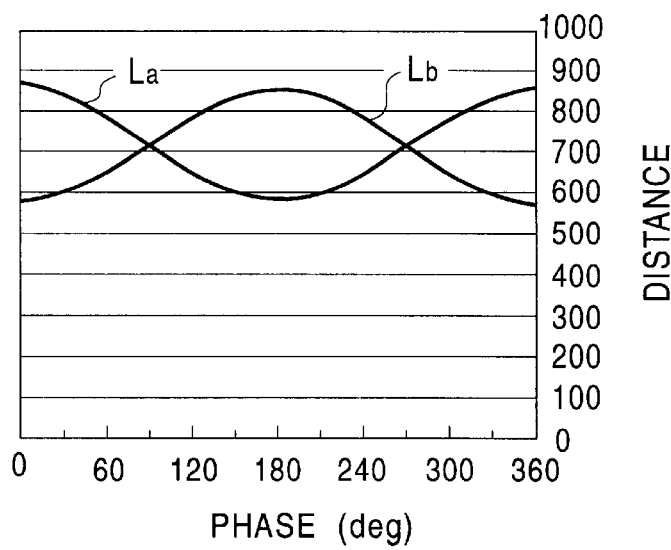
FIGS. 13A, 13B, and 13C show the results of numerical calculations when a major axis α of an elliptical trajectory: a minor axis β thereof=200:0.
Figure 13B:
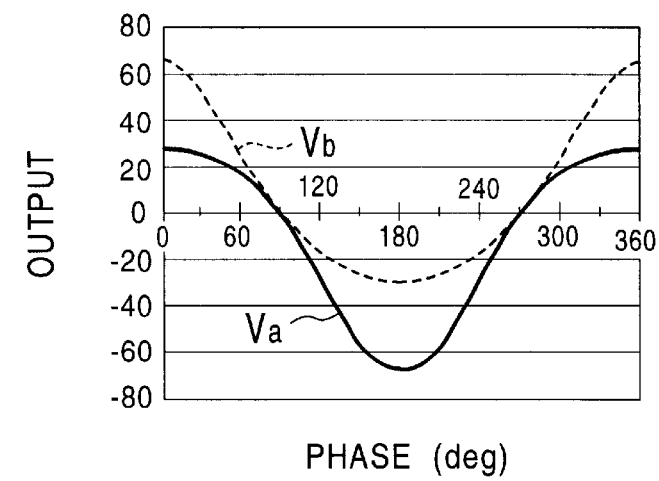
Figure 13C:
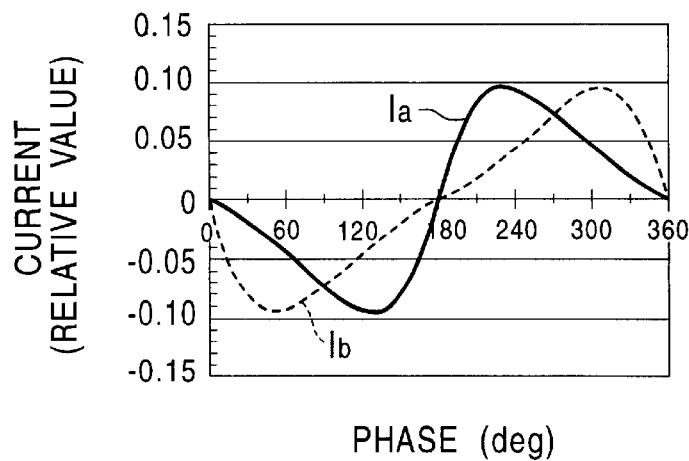
Figure 14A:
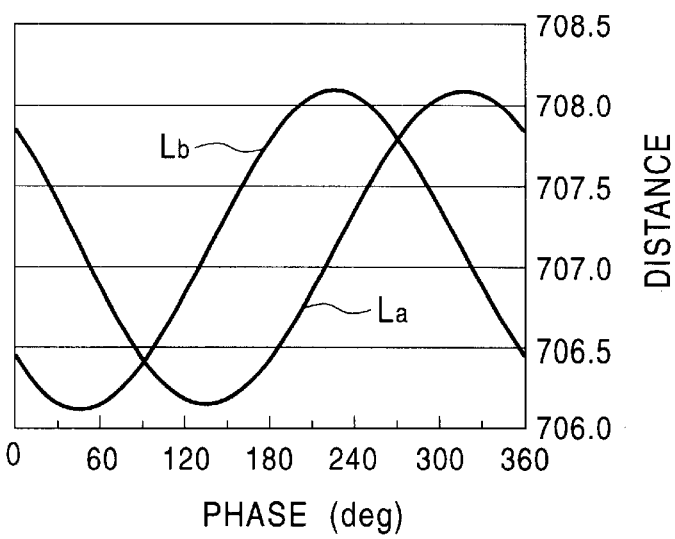
FIGS. 14A, 14B, and 14C show the results of numerical calculations when the ratio of a polarization coefficient in the X direction to a polarization coefficient in the Y direction is greatly varied in a complete circular trajectory.
Figure 14B:
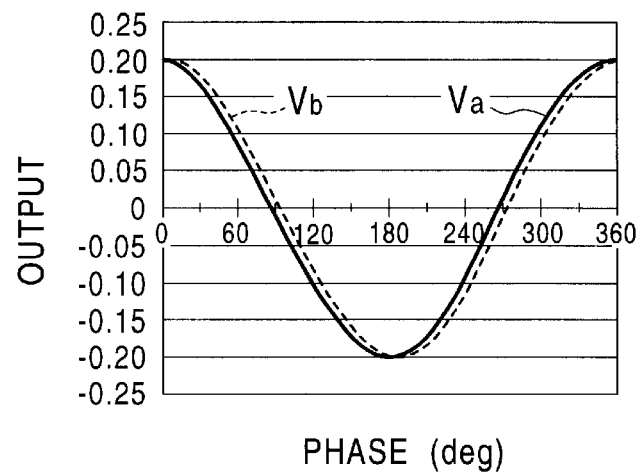
Figure 14C:
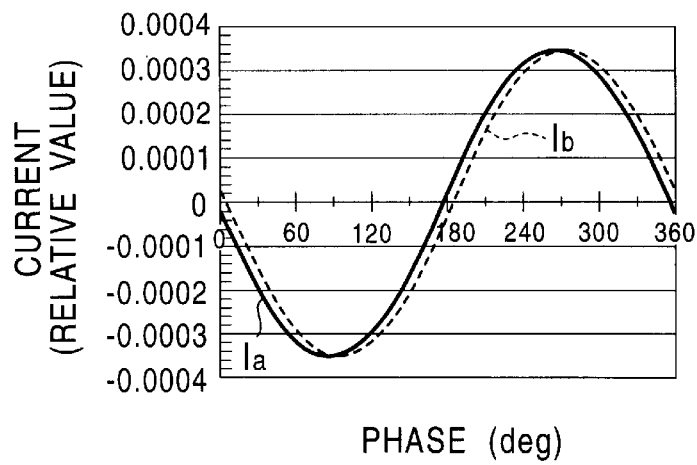
Figure 15A:
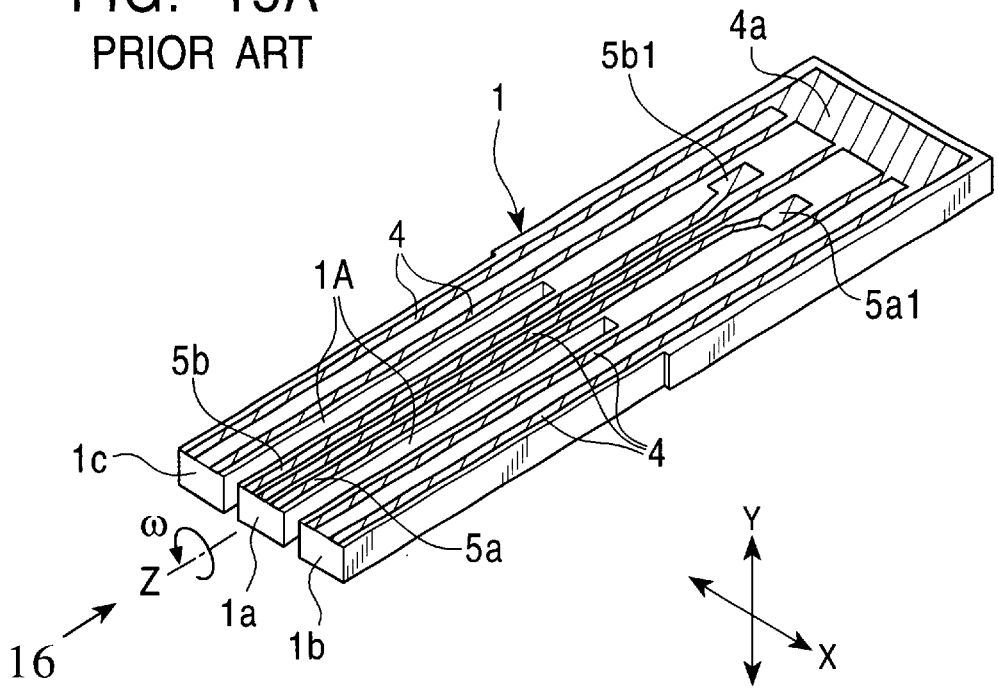
FIG. 15A is a perspective view showing one of the surfaces of a conventional three-pronged tuning-fork-type piezoelectric oscillator.
Figure 15B:
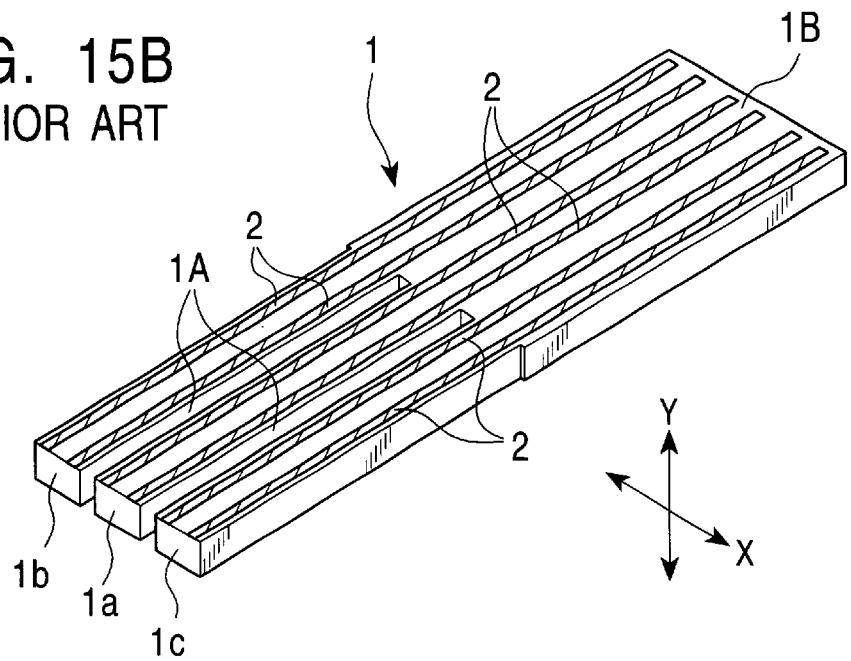
FIG. 15B is a perspective view showing the other surface thereof.
Figure 16:
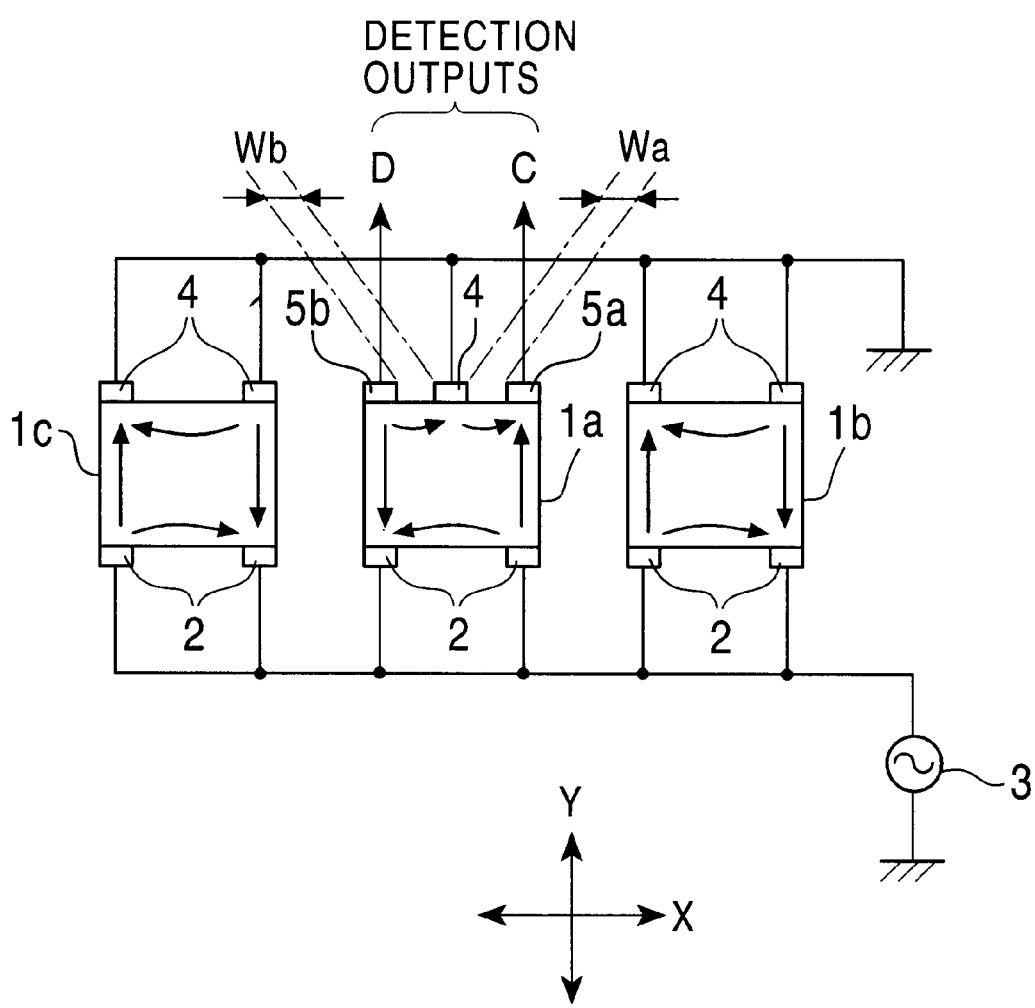
FIG. 16 is a front view of the piezoelectric oscillator when the piezoelectric oscillator of FIG. 15A is viewed from the direction of arrow 16.

| | Electrode position Lx | Electrode position Ly | Ellipse major axis α | Ellipse minor axis β | Polarization coefficient $K_{xa}$ | Polarization coefficient $K_{ya}$ | Polarization coefficient $K_{xb}$ | Polarization coefficient $K_{yb}$ | Remarks |
|---|---|---|---|---|---|---|---|---|---|
| First embodiment | 500 | 500 | 1 | 0 | 100 | 100 | −100 | −100 | FIGS. 8A, 8B, and 8C |
| Second embodiment | 500 | 500 | 1 | 0.05 | 100 | 100 | −100 | −100 | FIGS. 9A, 9B, and 9C |
| Third embodiment | 500 | 500 | 1 | 0.1 | 100 | 100 | −100 | −100 | FIGS. 10A, 10B, and 10C |
| Fourth embodiment | 500 | 500 | 1 | 0.5 | 100 | 100 | −100 | −100 | FIGS. 11A, 11B, and 11C |
| Fifth embodiment | 500 | 500 | 1 | 1 | 100 | 100 | −100 | −100 | FIGS. 12A, 12B, and 12C |
| Sixth embodiment | 500 | 500 | 200 | 0 | 100 | 100 | −100 | −100 | FIGS. 13A, 13B, and 13C |
| Seventh embodiment | 500 | 500 | 1 | 1 | 100 | 5 | −100 | −5 | FIGS. 14A, 14B, and 14C |

The first embodiment is shown in FIGS. 8A, 8B, and 8C. The first embodiment shows numerical calculation results in a case in which the ratio of the major axis α of the elliptical trajectory to the minor axis β thereof is α:β=1:0, that is, in a case in which the piezoelectric oscillator 11 is not present in a rotating system. This embodiment shows a case in which, since a Coriolis force does not occur in the piezoelectric oscillator 11, the vibration leg 11ν is driven to vibrate in a linear manner only in the X direction. Therefore, as shown in FIG. 8A, the relationship between the distance $L_a$ between the output electrode a and the center axis $O_y$ and the distance $L_b$ between the output electrode b and the center axis $O_y$ when the center axis $O_y$ is at an arbitrary position in the linear trajectory is such that the phases are π (180°) out of phase from each other. This means that the distortion which occurs in the +X direction and the distortion which occurs in the −X direction are π (180°) out of phase from each other.

ratio of the major axis α of an elliptical trajectory to the minor axis β thereof is set to α:β=1:0.05. FIGS. 10A, 10B, and 10C show analysis results of each numerical calculation in a third embodiment in which α:β=1:0.1. FIGS. 11A, 11B, and 11C show analysis results of each numerical calculation in a fourth embodiment in which α:β=1:0.5. FIGS. 12A; 12B, and 12C show analysis results of each numerical calculation in a fifth embodiment when α:β=1:1. FIGS. 9A, 10A, 11A, and 12A show the relationship between the distance $L_a$ between the neutral axis O and the output electrode a and the distance $L_b$ between the center axis $O_y$ and the output electrode b when the center axis $O_y$ is positioned at an arbitrary point in an ellipse or a circular trajectory. FIGS. 9B, 10B, 11B, and 12B show each of voltage outputs $V_a$ and $V_b$. FIGS. 9C, 10c, 11C, and 12C show each of current outputs $I_a$ and $I_b$. The elliptical trajectory of FIG. 9 has a great flatness, is more circular as in FIGS. 10 and 11, and is completely circular in FIG. 12.

As shown in FIGS. 8A, 9A, 10A, 11A, and 12A, it can be seen that the phase difference between the distance $L_a$ and the distance $L_b$ appears to be large with respect to an elliptical trajectory which is more flat than a linear vibration driving, with respect to a trajectory which is more circular than a flat elliptical trajectory, and with respect to a complete circular trajectory than an elliptical trajectory which is nearly circular.

Also, as shown in FIGS. 8B, 9B, 10B, 11B, and 12B and in FIGS. 8C, 9C, 10C, 11C, and 12C, it can be confirmed from the waveforms that the greater the phase difference between the distance $L_a$ and the distance $L_b$, the greater the phase difference between the voltage outputs $V_a$ and $V_b$ and the phase difference between the current outputs $I_a$ and $I_b$.

From these results, it is confirmed that the larger the elliptical motion the piezoelectric oscillator 11, that is, the more the elliptical trajectory of the vibration leg 11v becomes circular as a result of a large Coriolis force acting on the vibration leg 11v, the larger the phase difference occurs between the voltage outputs $V_a$ and $V_b$ and between the current outputs $I_a$ and $I_b$. This coincides with the actually measured values.

FIGS. 13A, 13B, and 13C show a sixth embodiment in which the ratio of the major axis α of the elliptical trajectory to the minor axis β thereof is set at α:β=200:0. This corresponds to a case in which only the amplitude of the vibration leg 11v is made 200 times larger when the amplitude of the first embodiment (when the piezoelectric oscillator 11 is not in a rotating system) is set at 1.

As shown in FIG. 13A, when the amplitude of the vibration leg 11v is simply increased in the X direction, the distance $L_a$ and the distance $L_b$ are increased, but their mutual phase relationship does not vary. As a result, the outputs themselves of the voltage outputs $V_a$ and $V_b$ are increased more than those of the first embodiment, and the voltage output $V_a$ becomes an output which is biased in the positive direction, and the voltage output $V_b$ becomes an output which is biased in the negative direction. The current outputs $I_a$ and $I_b$ are also increased, and it can be confirmed that distortion occurs in one of the current outputs $I_a$ and $I_b$. This coincides with the actually measured values.

FIGS. 14A, 14B, and 14C show a seventh embodiment in which the ratio of the major axis α of the elliptical trajectory to the minor axis β thereof is set at α:β=1:1, that is, it shows a case in which the piezoelectric oscillator 11 draws a complete circular trajectory and the ratio of the polarization coefficient in the X direction to the polarization coefficient in the Y direction varies greatly. As shown in FIG. 14A, even if the ratio of the polarization coefficient in the X direction to that in the Y direction is varied, the phase difference between the distances $L_a$ and $L_b$ does not vary. However, when a comparison with the fifth embodiment shown in FIG. 12 is made, the phase difference between the voltage outputs $V_a$ and $V_b$ and the phase difference between the current outputs $I_a$ and $I_b$ are decreased.

From these results, it can be seen that the phase differences between the voltage outputs $V_a$ and $V_b$ and between the current outputs $I_a$ and $I_b$ are detected to be the greatest when the ratio the polarization coefficient ($P_{xa}$, $P_{xb}$) in the X direction to the polarization coefficient ($P_{ya}$, $P_{yb}$) in the Y direction is 1:1, and phase differences are detected to be small as this ratio deviates therefrom. This also coincides with the actually measured values.

As a result of the analysis of the above numerical calculations, equation (3) shown in the above considerations may be said to be appropriate in order to visually recognize the waveforms of the current outputs $I_a$ and $I_b$, even though the dimensions are different.

According to the present invention which has thus been described in detail, since an output can be obtained by merely forming an output electrode a and an output electrode b in the same plane as vibration legs, there is no need to form a ground electrode as in a conventional case. Therefore, an electrode manufacturing process can be simplified. Also, since there is no need to make the creeping distance between an output electrode and a ground electrode uniform, the problem of insulation breakdown can be solved.

In addition, by providing each output electrode at a position far away from the center axis, it is possible to reliably detect a phase difference between the current outputs.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A piezoelectric oscillator to output an angular velocity proportional to a Coriolis force in a rotating system, said piezoelectric oscillator comprising:
    a plurality of vibration legs, each vibration leg having a rectangular cross section and a center axis;
    a pair of driving electrodes formed on a first surface of each vibration leg, each pair of driving electrodes having a spacing therebetween and extending in a direction of a length of the vibration leg in a plane extending in said driving direction; and
    a pair of output electrodes opposing said driving electrodes formed on a second surface of each vibration leg, the second surface opposing the first surface, each pair of output electrodes extending in the direction of the length of the vibration leg, each pair of output electrodes symmetrically disposed around and positioned as far as possible from the center axis of the vibration leg on which the pair of output electrodes is disposed, and all but one pair of output electrodes configured to receive an invariable potential.

2. A piezoelectric oscillator according to claim 1, wherein three vibration legs are provided in the oscillator, and a driving signal is provided between said driving electrodes and said output electrodes so that an angular velocity component proportional to a Coriolis force is detected from at least one set of output electrodes from among said output electrodes.

3. A piezoelectric oscillator according to claim 1, wherein said invariable potential is a ground potential.

4. A signal detection apparatus using a piezoelectric oscillator according to claim 1, said piezoelectric oscillator further comprising a current-to-voltage conversion mechanism to convert a current output obtained from said output electrodes into a voltage output, each of said output electrodes being grounded via an imaginary short-circuit in said current-to-voltage conversion.

5. A piezoelectric oscillator to output an angular velocity proportional to a Coriolis force in a rotating system, said piezoelectric oscillator comprising:
    a plurality of vibration legs, each vibration leg having a rectangular cross section and a center axis;

a pair of driving electrodes formed on a first surface of each vibration leg, each pair of driving electrodes having a spacing therebetween and extending in a direction of a length of the vibration leg in a plane extending in said driving direction; and a pair of output electrodes opposing said driving electrodes formed on a second surface of each vibration leg, the second surface opposing the first surface, each pair of output electrodes extending in the direction of the length of the vibration leg, each vibration leg having only one pair of output electrodes.

6. A piezoelectric oscillator according to claim 1, wherein three vibration legs are provided in the oscillator, and a driving signal is provided between said driving electrodes and said output electrodes so that an angular velocity component proportional to a Coriolis force is detected from at least one pair of output electrodes from among said output electrodes.

7. A piezoelectric oscillator according to claim 1, wherein all but one pair of output electrodes is configured to receive an invariable potential.

8. A piezoelectric oscillator according to claim 7, wherein said invariable potential is a ground potential.

9. A piezoelectric oscillator according to claim 1, wherein each pair of output electrodes is symmetrically disposed around and positioned as far as possible from the center axis of the vibration leg on which the pair of output electrodes is disposed.

10. A signal detection apparatus using a piezoelectric oscillator according to claim 1, said piezoelectric oscillator further comprising a current-to-voltage conversion mechanism to convert a current output obtained from said output electrodes into a voltage output, each of said output electrodes being grounded via an imaginary short-circuit in said current-to-voltage conversion.

11. A piezoelectric oscillator according to claim 1, wherein each output electrode opposes a corresponding driving electrode.

12. A piezoelectric oscillator according to claim 1, wherein all output electrodes are formed on surfaces that are approximately on a single plane.

13. A piezoelectric oscillator according to claim 1, wherein no output electrode is formed on the center axis of any vibration leg.

* * * * *